United States Patent Office 3,542,545
Patented Nov. 24, 1970

3,542,545
FROST OR RELIEF WRINKLING OF AN IMAGING ARTICLE COMPRISING AN ELECTRICALLY PHOTOSENSITIVE LAYER AND A DEFORMABLE LAYER
William L. Goffe, Webster, N.Y., assignor to Xerox Corporation, Rochester, N.Y., a corporation of New York
Continuation-in-part of application Ser. No. 520,423, Jan. 13, 1966. This application Jan. 2, 1968, Ser. No. 695,074
Int. Cl. G03g 13/22
U.S. Cl. 96—1.1
20 Claims

ABSTRACT OF THE DISCLOSURE

An imaging member comprising an overlayer of material preferably photosensitive, on a softenable, electrostatically deformable layer is imaged by frost or relief wrinkling the deformable layer. In a preferred mode, where the overlayer is photosensitive wrinkling is caused by uniformly electrostatically charging the member, exposing said member to an imagewise pattern of radiation actinic to said overlayer of photosensitive material and softening the softenable, electrostatically deformable layer to cause it to wrinkle thereby effecting the overlayer in a variety of ways to produce a variety of imaged members.

CROSS-REFERENCES TO RELATED APPLICATIONS

This is continuation-in-part of my copending application Ser. No. 520,423, filed Jan. 13, 1966, now abandoned.

BACKGROUND OF THE INVENTION

This invention relates in general to an imaging system and more specifically to the imagewise wrinkling by frost or relief of a softenable, electrostatically deformable layer with an overlayer.

Frost and relief wrinkling produce surface deformations or wrinkles on a deformable layer by the combined influence of an electrostatic field and softening up the deformable layer.

Relief wrinkling produces a ridge-like wrinkle in the deformable layer at the boundaries or edges of charge-no charge locations, (lines of high potential gradient in the applied charge pattern) and is thus most suitable for the reproduction of high contrast subjects such as line copy or the outlines of solid area subjects. See for examples of relief wrinkling Glenn, Jr. Pat. 3,113,179; Norton Pat. 2,985,866; Dreyfoos, Jr., et al. Pat. 3,055,006; Boldebuck Pat. 3,063,872 and Cusano et al. Pat. No. 3,095,324.

Frost wrinkling produces a series of very small surface wrinkles over an entire charge area giving the image a frosted appearance with the frosted areas highly light scattering and appearing as dark portions on an imaging screen, in ordinary projection. Frost wrinkling is noted for its ability to produce high quality continuous tone as well as line copy images. For examples of frost wrinkling see Gunther et al. Pat. 3,196,011, Mihajlov et al. Pat. 3,196,008, and Gundlach and Claus, A Cyclic Xerographic Method Based on Frost Deformation, Phot. Sci. & Eng. 7.1 pp. 14–19 (1963).

There are a number of imaging systems involving frost or relief deformation of a member comprising an overlayer of material at the surface of the softenable, electrostatically deformable layer.

One such system is disclosed in an article by F. H. Nicoll, RCA Review, 209–231 (June 1964) and further in Nicoll et al. Pat. 3,317,315. The imaging member generally comprises a thin, preferably less than about 0.01 microns thick, inert film on a deformable thermoplastic which is imaged by depositing charge on this thin surface layer in image configuration and heating the deformable layer to its softening point which results in wrinkling in charged areas.

Although advantageous in some respects, the Nicoll system is limited by the requirement of requiring extremely thin overlying films, i.e. less than 0.1 microns thick and preferably less than 0.01 microns thick. Also, in the only direct optical mode of forming the latent image wherein a photoconductive deformable layer is specified, a special high intensity, ultra-violet radiation image or an extremely high exposure (15,000 f.c.s.) of conventional tungsten filament radiation is required to cause imagewise wrinkling. Also, in this optical mode of imaging, the photoconductive deformable layer is sandwiched between other layers, thus inherently decreasing photosensitivity over a system, for example, employing a photosensitive layer as a free surface of the imaging member.

A second system employing the electrostatic deformation of a layer with an overlayer of material at the surface of the deformable layer is disclosed in copending application Ser. No. 670,824, filed Sept. 15, 1967. As described therein, a skin not greater than about 0.3 microns thick is formed on the surface of a substantially non-frostable thermoplastic material to convert it to a frostable material. However, the only direct, optical mode of forming a frost image utilizing a photosensitive material, described therein, is by the conventional system (for example, see Gunther et al. Pat. 3,196,011) of employing the deformable layer (with skin) on a photoconductor of typical xerographic plate thickness (20 to 100 microns) overlying a substrate. This mode of optically forming the latent image also suffers from the disadvantage, inter alia, that the photoconductive layer must be exposed as a sandwiched layer. No process is described where the photosensitive layer is a free surface of the imaging member.

A more distant but somewhat related system is disclosed in Corrsin Pat. 3,238,041 and Mihajlov et al. Pat. 3,196,008 where a photoconductive deformable layer of deformable thickness (optionally coated on a deformable non-photoconductor) is itself wrinkled in frost or relief. The minimum deformable thickness of the photoconductor layer is described in the two abovementioned patents to be about 1 to 2 microns which conforms with the 1–1.5 micron deformable thickness lower limit threshold specified in the oft referred to aforementioned frost publication by Gundlach and Claus. Although, it has been reported in Australian Pat. 260,003 that relief wrinkling has been obtained in films as thin as 0.254 microns. While advantageous in the respect that the photoconductor is a free surface of the imaging member the thickness and resulting opacity of the photoconductor layer eliminates all but transparent photoconductors, including preferred photoconductors comprising amorphous selenium, if the imaged member is to be used as a transparency. Also, the thickness of the photoconductor calls for relatively large amounts of relatively expensive photoconductor materials and the photoconductor must additionally possess the specific properties of a softenable, electrostatically deformable layer.

Thus, although the above described systems wherein a deformable layer with an overlayer is wrinkled in image configuration are advantageous in certain situations, there is a continuing need for a simpler and more versatile and inexpensive system for imaging surface layered and specifically free surface photosensitive layered electrostatically deformable layers.

SUMMARY OF THE INVENTION

It is, therefore, an object of this invention to provide an electrostatic deformation imaging system which overcomes the above-noted deficiencies and satisfies the above-noted wants.

It is a further object of this invention to provide an electrostatic deformation imaging system which may be imaged by optically forming the latent image.

It is a further object of this invention to provide an electrostatic deformation imaging system which obviates the necessity for extremely thin surface layers on the softenable, electrostatically deformable layer.

It is a still further object of this invention to provide an electrostatic deformation imaging system an embodiment of which employs a mechanically continuous overlayer, preferably photosensitive, on the softenable, electrostatically deformable layer.

It is a still further object of this invention to provide an electrostatic deformation imaging system an embodiment of which employs a fracturable and preferably particulate surface layer, preferably photosensitive on the softenable, electrostatically deformable layer.

It is a still further object of this invention to provide an electrostatic deformation imaging system wherein the imaging member is erasable and may be reused.

It is a still further object of this invention to provide an electrostatic deformation imaging system which employs a photosensitive overlayer on a softenable, electrostatically deformable layer which is thousands of times more photosensitive than the closest prior art systems.

It is a still further object of this invention to provide an electrostatic deformation imaging system employing a single charge and single exposure imaging process.

It is a still further object of this invention to provide an electrostatic deformation imaging system which obviates the necessity for deformably thick photoconductor layers on the electrostatically deformable layer.

It is a still further object of this invention to provide an electrostatic deformation imaging system employing producing images viewable directly and by reflection and transmission, using a wide variety of opaque and transparent photosensitive layers including the preferred opaque photoconductors comprising amorphous selenium.

It is a still further object of this invention to provide an electrostatic deformation imaging system which employs an imaging member comprising a non-deformably thin layer of a photosensitive material on a deformable layer.

It is a still further object of this invention to provide an electrostatic deformation imaging system which is positive to positive or positive to negative depending, inter alia, on the mechanical character of the overlayer and specifically whether the overlayers disrupts and laterally relocates in response to a wrinkled underlayer.

It is a still further object of this invention to provide an electrostatic deformation imaging system to produce wrinkled imaged members capable of being viewed by transmission which does not require transparent photoconductor layers.

The foregoing objects and others are accomplished in accordance with this invention by providing an imaging member comprising an overlayer of material preferably photosensitive, on a softenable, electrostatically deformable layer which is imaged by frost or relief wrinkling the deformable layer. In a preferred mode, where the overlayer is photosensitive, wrinkling is caused by uniformly electrostatically charging the member, exposing said member to an imagewise pattern of radiation actinic to said overlayer of photosensitive material and softening the softenable, electrostatically deformable layer to cause it to wrinkle thereby effecting the overlayer in a variety of ways to produce a variety of imaged members.

BRIEF DESCRIPTION OF THE DRAWINGS

For a better understanding of the invention as well as other objects and further features thereof, reference is made to the following detailed disclosure of this invention taken in conjunction with the accompanying drawings wherein:

In FIG. 5 the focus of the photomicrograph is at the surface of the undisturbed overlayer rendering the clustered, agglomerated overlayer portion slightly out of focus.

DESCRIPTION OF THE PREFERRED EMBODIMENTS

Figure 1:
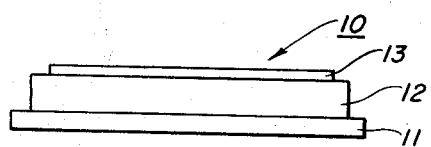
FIG. 1 is a partially schematic illustration of an embodiment of the imaging member according to the invention.

Referring now to FIG. 1 there is shown an embodiment of an imaging member 10 according to this invention comprising substrate 11, softenable, electrically insulating electrostatically deformable layer 12 which has at its upper surface an overlayer of material 13.

Substrate 11 may be electrically conductive or insulating. Conductive substrates generally facilitate the charging or sensitization of the member according to the invention and typically may be of copper, brass, nickel, zinc, chromium, stainless steel, conductive plastics and rubbers, aluminum, steel, cadmium, silver and gold. The substrate may be in any suitable form such as a metallic strip, sheet, plate, coil, cylinder, drum, endless belt, moebius strip or the like. If desired, the conductive substrate may be coated on an insulator such as paper, glass or plastic. Examples of this type of substrate are a substantially transparent tin oxide coated glass available under the trademark NESA from the Pittsburgh Plate Glass Co.; aluminized polyester film, the polyester film available under the trademark Mylar from Du Pont; or Mylar coated with copper iodide. Electrically insulating substrates may also be used which opens up a wide variety of film formable materials such as plastics for use as substrate 11. For self-supporting deformable layers 12, no support layer 11 is needed.

Electrostatically deformable layer 12 may be any suitable material which is typically solid at room temperature, electrostatically deformable in the invention hereof and is substantially electrically insulating at room temperature and at least for a short time when temporarily softened, for example, by heat or vapor, to its melting point.

The deformable layer generally requires highly insulating films, however, in cases where charging is continued during softening, films with low resistivities, on the order of about $10^{10}$ ohm-cm. may be employed. Layer 12 may be opaque or transparent but is preferably transparent to allow the resultant wrinkled member to be used as a transparency and to allow exposure of the member from the deformable layer side. Layer 12 should preferably be very smooth to enhance resultant image contrast between wrinkled and non-wrinkled areas of the deformable material.

Where deformable layer 12 is to be softened by heating, it may comprise, for example, any suitable electrically insulating thermoplastic resin capable of being softened at a moderate temperature and retaining an electrostatic charge at such a temperature. While the invention may conveniently be used with deformable materials which are solid at room temperature and which are temporarily softened by heating or the like, it can also be carried out with materials which are viscous, for example at about $10^5$ poises, at room temperatures but which can be solidified by cooling when required, and can also be carried out with materials that harden or polymerize by heating or being subjected to radiation.

Staybelite Ester 10 available from Hercules Powder Co.; Piccopale H-2 a highly branched polyolefin, Piccotex 100 an alpha methyl styrene-vinyl toluene copolymer, Hydrogenated Piccopale 100, all from Pennsylvania Industrial Chemical Corp.; and SR-5061A a silicone resin from Dow Corning Corp. are preferred deformable materials for use herein because of their suitable deformable and insulating properties and because of their high transparency. Transparency is also a preferred characteristic since it provides contrast between typically opaque and more light absorbing materials used in overlayer 13.

Many other materials have been found which are suitable for forming layer 12 and which are suitable for use with solvent vapor softening procedures as well as with heat softening. Any suitable deformable material may be used. Table 1 below is a typical partial list of such materials.

TABLE I

| Trademark | Chemical type | Manufacturer |
| --- | --- | --- |
| 1. Piccotex | Styrene | Pennsylvania Industrial Chemical Corp. |
| 2. Piccolyte | Terpene | Do. |
| 3. Staybelite 5 | Rosin ester | Hercules Powder Co. |
| 4. Staybelite 10 | do | Do. |
| 5. Piccoumaron | Coumarone | Pennsylvania Industrial Chemical Corp. |
| 6. Piccolastic D150 | Styrene | Do. |
| 7. Piccoflex 100A | Polyvinyl chloride | Do. |
| 8. Neville R13 | Coumarone indene | Neville Chemical Corp. |
| 9. Neville soft | Phenol modified coumarone indene. | Do. |
| 10. Piccolastic E125 | Styrene | Pennsylvania Industrial Chemical Corp. |
| 11. Piccolastic D125 | do | Do. |
| 12. Picco 75 | Indene | Do. |
| 13. Piccopale 70 | Hydrocarbon (unsaturated). | Do. |
| 14. Piccolastic A-50 | Styrene | Do. |
| 15. Piccolastic A-75 | do | Do. |

Layer 12 may also be a surface treated layer as described in aforementioned copending application Ser. No. 670,824, or any other material useful in electrostatic deformation imaging as described in the aforementioned frost and relief publications and patents. Also, many of the materials described therein are suitable for use in layer 12 of the present invention without pre-treatment.

Layer 12 may have a thickness lying within a broad range. In general, however, it has been found that deformation or wrinkling does not take place, or at least is not readily observable, when layer 12 is much less than about ½ micron in thickness. As layer 12 is increased in thickness, the frosted areas change in appearance from a very fine-grained frosting to a relatively coarse-grained bubbly appearance. However, relief or frost type wrinkling is observable with deformable layers in excess of 100 microns thickness. A thickness of from about ½ to about 16 microns is found to be preferred for very high resolution, high density and otherwise optimum quality images.

Mechanically, overlayer 13 as illustrated in FIG. 1 is mechanically continuous, for example, as opposed to unbonded particulate layers or layers which disrupt and relocate in relation to the surface of layer 12, but including such overlayers as particles in a binder and semi-continuous layers such as perforated or Swiss cheese patterned layers. Continuous overlayers preferably should be very smooth to enhance resultant image contrast between wrinkled and non-wrinkled areas.

However, layer 13 may also be in the form of an easily fracturable film preferably composed of particles which may or may not be disruptable and laterally relocatable to produce bare spaces when the overlayer is deformed by amounts comparable to its thickness, due to a deforming deformable underlayer. When layer 13 is fracturable and preferably particulate, the particles are typically at least partially embedded in the top surface of layer 12 and in many cases may be completely embedded contiguous to the top surface of layer 12 so that the tops of the particles are slightly below the top surface of layer 12 to provide a more abrasion resistant imaging member.

The term "laterally relocatable" and variant forms thereof used herein define a layer over a softenable, electrostaticaly deformable layer which when disrupted by a frost or relief type wrinkling of the deformable underlayer causes the overlayer to break up into particles of the size of an image element or less, the particles tending to move from the deformation peaks to agglomerate in the deformation valleys.

Overlayer 13, no matter what its form mechanically, is preferably photosensitive to permit the member to be wrinkled by a novel optical exposure imaging mode comprising the steps of uniformly electrostatically charging member 10, exposing it to a pattern of radiation actinic to layer 13 and softening layer 12.

When layer 13 is mechanically continuous or fracturable but not disruptable and laterally relocatable when an underlying deformable layer is frost or relief wrinkled, the thickness of the overlayer is a factor in high resolution embodiments and for optimum quality wrinkle images should be a thickness of between about 0.01 and about 0.5 micron. In this range of thin films even generally opaque photosensitive materials are significantly light transmitting in smooth layers permitting the imaged member to be used as a transparency, with transmission being retarded in wrinkled areas by light diffusion effects, assuming at least a partially transparent deformable layer 12 and substrate 11. It is found that where the thickness of layer 13 is greater than about 0.5 micron it tends to rapidly lose its flexibility to respond to and wrinkle according to the wrinkles produced on the deformable layer. Thicknesses thinner than about 0.01 became increasingly difficult to fabricate.

Where layer 13 is fracturable and preferably particulate, and subject to disruption and lateral relocation when relief or frost wrinkled by amounts comparable to its thickness, due to a deforming underlying deformable layer which is frost or relief wrinkled, a preferred thickness range is from about 0.2 micron to about 2 microns which provides for good lateral relocation properties, good density, resolution and contrast in the resultant image and ease of fabrication. Where overlayer 13 comprises particles, the maximum average size of particles should be no greater than about 1 micron, although layer 13 with thicknesses greater than 2 or 3 microns will work, in order to provide maximum resolution and should not exceed in average size about ⅓ of the thickness of layer 12.

A mechanically continuous overlayer 13 may be formed by any suitable method. Typical methods include vacuum evaporation of layers comprising a predominating amount of amorphous selenium such as the preferred mode of holding the depositing substrate between about 30 and about 40° C. and keeping the source temperature between about 230 and 260° C. in a partial vacuum of about $1.4 \times 10^{-6}$ torr. The layer may also be formed by methods disclosed in the pigment/binder Middleton et al. Pat. 3,121,006.

Fracture overlayers which may be disruptable and laterally relocatable may also be formed by vacuum evaporation techniques, changing the process parameters to produce fracturable layers as opposed to continuous layers. For example, fracturable layers comprising a predominating amount of amorphous selenium may be vacuum evaporated by evaporating at a deposition rate of about ½ micron per hour onto a substrate held at about 65° C. in a vacuum of about $10^{-4}$ to about $10^{-5}$ torr. Fracturable overlayers may also be made by cascading, dusting or by stripping methods as described in copending application Ser. No. 685,536, filed Nov. 24, 1967, or any other suitable method.

Overlayer 13 no matter what its form mechanically, should be sufficiently electrically insulating, or more specifically non-charge injecting into layer 12 in the absence of actinic radiation, to retain a charge while the process steps hereof are carried out, and should be otherwise capable of optically responding to the wrinkling of layer 12 to form imaged members as described herein.

When overlayer 13 is photosensitive, any suitable continuously or fracturably layered photosensitive material may be used herein. Typical such material include inorganic or organic photoconductive materials.

Preferred inorganic photoconductors for use herein because of the excellent quality of the resultant images are amorphous selenium; amorphous selenium alloyed with arsenic, tellurium, antimony or bismuth, etc., and amorphous selenium or its alloys doped with halogens. Other inorganic photoconductors capable of being layered on the electrostatically deformable layer hereof include particulate photoconductive materials such as zinc sulfide, zinc cadmium sulfide, French process zinc oxide, phthalocyanine, cadmium sulfide, cadmium selenide, zinc silicate, cadmium sulfoselenide, linear quinacridones, etc. coated on layer 12 to produce fracturable overlayers or dispersed in an insulating inorganic film forming binder such as a glass or an insulating organic film forming binder such as an epoxy resin, a silicone resin, an alkyd resin, a styrene-butadiene resin, a wax or the like to form continuous overlayers. Other typical photoconductive insulating materials include: blends, copolymers, terpolymers, etc. of photoconductors and non-photoconductive materials which are either copolymerizable or miscible together to form solid solutions and organic photoconductive materials of this type include: anthracene, polyvinylanthracene, anthraquinone, oxadiazole derivatives such as 2,5-bis-(p-aminophenyl)-1,3,4-oxadiazole; 2-phenylbenzoxazole; and charge transfer complexes made by complexing resins such as polyvinyl carbazole, phenolaldehydes, epoxies, phenoxies, polycarbonates, etc. with Lewis acids such as phthalic anhydride; 2,4,7-trinitrofluorenone; metallic chlorides such as aluminum, zinc or ferric chloride; 4,4-bis (dimethylamino) benzophenone; chloranil, picric acid; 1,3,5-trinitrobenzene; 1-chloroanthraquinone; bromal; 4-nitrobenzaldehyde; 4-nitrophenol; acetic anhydride; maleic anhydride; boron trichloride; maleic acid, cinnamic acid; benzoic acid; tartaric acid; malonic acid and mixtures thereof.

The imaging members hereof employing photosensitive overlayers are preferably processed by uniformly electrostatically charging it, imagewise exposing it to radiation actinic for the photosensitive overlayer and softening the softenable, deformable layer to cause an imagewise wrinkling.

Figure 2:
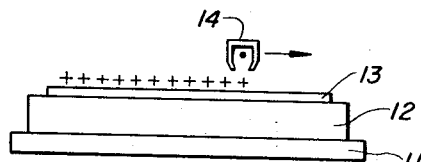
FIG. 2 is a partially schematic illustration of the uniform electrostatic charging step according to the invention.

Referring now to FIG. 2, the imaging member is uniformly electrostatically charged, generally in the substantial absence of actinic radiation for layer 13, illustratively by means of a corona discharge device 14 which is shown to be traversing the member from left to right depositing a uniform charge on the surface of layer 13. For example, corona discharge devices of the general description and generally operated as disclosed in Vyverberg Pat. 2,836,725 and Walkup Pat. 2,777,957 have been found to be excellent sources of corona useful in the charging of member 10. Other charging techniques ranging from rubbing the member, to induction charging, for example, as described in Walkup Pat. 2,934,649 are available in the art. The surface charge potentials of layer 13 preferred for imaging herein may run from a few to as high as 4000 volts depending on materials used, layer thicknesses and whether relief or frost wrinkling is desirable. For optimum quality images, where laterally non-relocatable overlayers are used, the potential should be in the preferred range of from about negative or positive 30 to about 300 volts.

Where substrate 11 is an insulating material, or where there is no substrate 11, charging of the member, for example, may be accomplished by placing the insulating substrate in contact with a conductive member and charging as illustrated in FIG. 2. Alternatively, other methods known in the art of xerography for charging xerographic plates having insulating backings may be applied. For example, the member may be charged using double sided corona charging techniques where two corona charging devices on each side of the member and oppositely charged are traversed in register relative to member 10.

Figure 3:
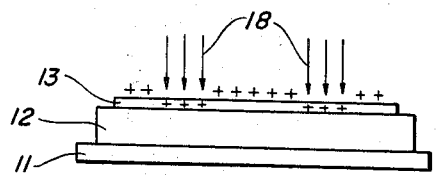
FIG. 3 is a partially schematic illustration of the imagewise exposure step of the invention.

Referring now to FIG. 3, there is illustrated the step of imagewise exposing the uniformly charged imaging member to light pattern 18 corresponding to an original to be reproduced. The light source used in imaging should supply light or other radiation of the type to which layer 13 is sensitive.

Any suitable actinic electromagnetic radiation may be used. Typical types include radiation from ordinary incandescent lamps, X-rays, beams of charged particles, infra red, ultra violet and combinations thereof.

For purposes of illustration, the surface electrical charges deposited in the charging step of FIG. 2 are depicted as having moved into photosensitive layer 13 in the imagewise exposed areas. It is thought that electrical charges in exposed areas are injected into layer 13 and in the unexposed areas are left essentially residing on the surface to pivot the imaging member's sensitivity to light in the overlayer 13 and its interface with layer 12, not on the photoconductivity of the bulk of the deformable layer 12. It is also thought this charge, in some instances, is further injected into deformable layer 12 due at least in part to the softened condition of the deformable layer 12 during the softening step to thus remove the deforming charge forces from the photosensitive layer and corresponding portions of wrinkable layer 12 leaving deforming charge areas on the unexposed photosensitive layer and corresponding wrinkable layer 12 portions which become wrinkled when softened.

It is not essential, as for example, in xerography, or the Nicoll imaging method, that the exposure step result in either the substantial discharge of the member or the appreciable lowering of the electrical fields or surface charge potential in the light struck areas to form a latent electrostatic image. Rather selective relocation of charge into layer 13 is sufficient to produce a developable latent image in accordance with the present invention.

It is thought that deformation occurs in the light struck areas when the following conditions are met: exposure of layer 13 to the optical image causes charge to selectively move to the interface of layers 13 and 12, and the softening step does not cause charge injection into layer 12. Deformation occurs in the unexposed areas when the exposure step produces selective relocation of the charge at the interface and charge injection into layer 12 does result when layer 12 is softened. Deformation also occurs in the unexposed areas when plate materials are selected such that exposure of layer 13 to actinic radiation itself produces charge injection into layer 12 before the softening step.

If desired, the above described charging and exposure steps may be carried out simultaneously rather than sequentially. Apparatus especially suitable for simultaneous charge/expsoure is disclosed, for example, in Gunther et al. Pat. 3,196,011.

While the optical mode, just described, of forming the latent image is preferred because of its simplicity and because of the high quality images produced thereby, other modes of forming a latent image which may be wrinkled in image configuration may be used. For example, overlayered deformable layers, as described herein, may be layered on a xerographic type photoconductor layer on a conductive substrate and imaged as described in Gunther et al. Pat. 3,196,011 by a charge, expose, recharge process or other process variations described therein. It is also noted that in cases where it is more desirable to use light-absorbing or opaque material for layer 13, exposure of the xerographic type photoconductor layer may be made through a transparent substrate for the photoconductor layer, according to well-known xerographic techniques. An illustratively suitable combination of specific materials for such a member would be a layer 13 of graphite particles, layer 12 of Staybelite Ester 10, a xerographic type photoconductive layer of vitreous selenium, for example about 60 microns thick and a substrate of NESA glass for the photoconductor layer. Equivalent materials may, of course, be used, and the optical properties of the components needs only meet the demands of the particular application desired.

Also layer 12 may be a self-deformable photoconductor on a conductive substrate, the latent image formed by uniformly charging and exposing. An illustratively suitable combination includes an overlayer 13 of graphite, a photoconductive deformable layer or 2,5-bis-(p-aminophenyl) 1,3,4-oxadiazole and a substrate of NESA glass. Equivalent materials may be also used.

Also, members comprising layers 13 and 12 hereof may be imaged by depositing electrostatic charge patterns thereon and then softening. Charge patterns may be depsoited by a wide variety of methods including charging in image configuration by ionization or electron charging through a mask of stencil or first forming such a charge pattern on a separate photoconductive insulating layer according to conventional xerographic reproduction techniques and then transferring this charge pattern to the members hereof by bringing the two layers into very close proximity and utilizing breakdown techniques as described, for example in Carlson Pat. 2,982,647 and Walkup Pat. 2,825,814 and 2,937,943. In addition, charge patterns conforming to selected, shaped, electrodes or combinations of electrodes may be formed by the "TEST" discharge techniques as more fully described in Schwertz Pats. 3,023,731 and 2,919,967 or by techniques described in Walkup Pat. 3,001,848 and 3,001,849, as well as by electron beam recording techniques, for example, as described in Glenn Pat. 3,113,179.

Frosting may also be caused by selective softening techniques such as exposing uniformly charged members hereof to an image pattern of softening infra red radiation or by selective hardening techniques such as described in Gundlach Pat. 3,307,941 or by techniques which selectively render ordinarily frostable materials unfrostable in image configuration as by imagewise contaminating an otherwise frostable layer.

Figure 4:
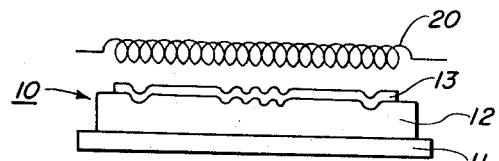
FIG. 4 is a partially schematic illustration of the softening step according to the invention, FIGS. 2–4 representing a preferred optical mode of forming an image according to the invention.

Referring now to FIG. 4, there is illustrated an embodiment of the softening step of this invention whereby layer 12 is softened sufficiently so that it becomes physically altered by the mechanical forces associated with the image pattern of electrostatic charge. Any suitable softening method may be employed provided it does not increase the electrical conductivity of layers 12 and 13 to the point where the electrical charges leak away or become dissipated before 12 deforms in image configuration. The most common method of softening is to heat or to expose layer 12 to solvents or solvent vapors for the materials of layer 12. For highest quality images mechanically continuous photosensitive overlayers should be softened as well as layer 12. The preferred mode of heat softening is illustrated in FIG. 4 wherein member 10 is shown positioned beneath resistance wire heating element 20. As the material of layer 12 is softened, it is enabled to flow in response to electrical forces acting upon it. As illustrated, the surface of layer 12 in unexposed areas develops a microscopically uneven surface. This uneven surface can also be described as rippled, stippled, reticulated or frosted. In addition, layer 13 is also caused to be wrinkled in corresponding areas by the wrinkling of layer 12, to change the optical properties of the member without fracturing or causing layer 13 to breakup or laterally relocated, because overlayer 13 is mechanically continuous. Some fracturable overlayers respond similarly. As will be explained, other fracturable overlayers are caused to be disrupted, disarranged and relocated laterally in wrinkled areas.

Heating is found to be a preferred mode of softening layer 12 to permit deformation, and in particular, heating the member for from about 1 to 20 seconds or more at a temperature of from about 50° C. to about 130° C. is found to be preferred for producing optimum quality images according to the invention.

When layer 12 is to be softened by the application of solvents or solvent vapors, the deformable layer material must be capable of absorbing sufficient quantities of a suitable solvent vapor in order that its viscosity be lowered to the point where frosting can take place. A perforated or Swiss cheese type photosensitive layer or a porous substrate 11 or both is preferred for solvent vapor softening so that solvent or vapors can readily penetrate to and into the deformable layer.

The solvent vapors should be absorbed by layer 13 in sufficient quantity to substantially lower the viscosity of layer 12 and the volatility of the solvent should be chosen where possible to provide a suitable hardening time for the layer. These solvent characteristics are those which would be obvious to a chemist but the electrical properties of the solvent also play a role in influencing image frosting. In the solvent softened condition, layer 12 may actually comprise a substantial amount of solvent, thus, the dielectric constant and resistivity of layer 12 is determined to some extent under these conditions by the dielectric constant and resistivity of the solvent.

Solvent liquids show a great variation in dielectric constant and resistivity. Typical examples of the dielectric constants of certain solvents useful in connection with image frosting are perchloroethylene 2.3, trichloroethyelne 3.4, and ethylene dichloride 10.0. As is apparent, where the solvent is applied after the charging step, the lower the dielectric constant of layer 12 the greater will be the electrostatic forces thereacross. It would thus appear desirable to use a solvent liquid having as low a dielectric constant as possible and experiments confirm that best results and most rapid frosting are obtained by using a solvent having a dielectric constant not greater than about that of trichloroethylene, i. e., 3.4.

A next processing step which may be carried out after developing is to reharden layer 12 freezing the wrinkled surface pattern in place, which pattern may then be viewed.

This can be accomplished, for example, by removing the source of heat, solvent vapor or the like used to soften deformable layer 12. It is generally desired to reharden layer 12 as soon as the wrinkled pattern appears. Heat softening generally permits quicker rehardening. Excessive softening temperatures or excessively prolonged periods of softening of layer 12 are also to be avoided because a loss of the image pattern may result, although as will be explained, for fracturable, laterally relocatable overlayers, erasure of the wrinkling will not erase the image.

In the embodiment of the imaging member where overlayer 13 is fracturable and is disrupted and laterally relocated where wrinkling occurs and the particles or material comprising layer 13 are thereby selectively rearranged and relocated laterally, the optical properties of the member are visibly changed in a novel and surprising way. Expectedly, the member is more diffusely reflecting in the wrinkled areas. But, surprisingly, contrary to expectations based on the teachings of the prior art, it is found that the member becomes relatively transparent in the relief or frost wrinkled areas, because the laterally relocatable portions of overlayer 13 drift in conformance with the pattern of the wrinkling on top of one another to cluster and accumulate in the valleys or pockets of the wrinkled image leaving the raised portions of the image uncovered. It is also thought that for certain materials for fracturable, laterally relocatable layer 13 such as the preferred materials comprising amorphous selenium, there is at least a partial melting together or agglomerating of the particles in the pockets of the wrinkles thus substantially decreasing the surface to volume ratio of the overlayer material. Also surprisingly it is noted that the deformation need not be permanent to permanently selectively render member 10 pellucid in wrinkled areas. Once the lateral relocation and selective transparentizing of layer 13 has taken place, the deformations of layer 12 may be "erased" without destroying the recorded image. In fact when the image is to be used in transmission it is found to be preferred to erase the wrinkles to eliminate the light diffracting effects in the transparentized areas. It is also found that even partial erasure of the wrinkles tends to embed the clustered portions of the fracturable layer and overcoat them with material from layer 12 to provide a fixed image. A directly viewable image results because the light absorbing properties in the deformed and relocated areas of layer 13 are found to be substantially reduced as compared with those portions of the layer remaining intact after imaging.

For example in the preferred member embodiment employing an essentially opaque overlayer and at least partially transparent layers 11 and 12, the wrinkled areas appear lighter.

Figure 5:
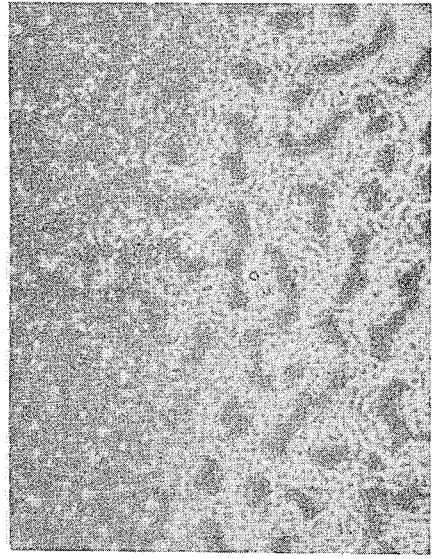
FIG. 5 is a one to one photograph of an about 1200× photomicrograph, from the overlayer side, of a portion of an imaging member hereof employing a fracturable, laterally relocatable selenium overlayer, with no frosting on the left portion of the figure and frosting on the right portion of the figure with an attendant clustering or agglomerating of the selenium particles on the right portion.

FIG. 5 shows this surprising transparentizing effect for such a preferred member embodiment. The frosted areas at the right portion of the figure are rendered more light transmitting and less absorbing thus appearing lighter to the eye. The frosting which produced the clustered effect has been substantially completely removed or "erased," as described above. In FIG. 5 in the laterally relocated areas, it is seen that not all of the overlayer particles cluster together. Some remain adhered to the layer 12 to form a mottled pattern between clusters.

Although the image produced by the instant process may be examined simply by looking at it, the image is highly suitable for display by transmitted light especially in the preferred materials embodiment where layers 11 and 12 are at least partially transparent and the material comprising overlayer 13 is essentially opaque. Thus the developed member may be used as a projection slide to produce a high resolution display of an image on a viewing screen or the like.

The image may also be displayed by means of a projection system such as shown in FIG. 1F of Gunther et al. Pat. 3,196,011 and optical systems employing reflected light such as taught in copending application Ser. No. 619,072, filed Feb. 27, 1967. Readout may also be by means of appropriate sensing means that can detect the selective displacement of particles. For example, magnetic sensing means may be used in conjunction with a layer 13 having a magnetic component.

Depending upon the mode of image formation, the materials used and the means for viewing or sensing the image, either a positive to positive or positive to negative imaging system results.

The terms "negative" and "positive" are used in the sense that a positive original comprises, darker graphic information on a relatively lighter background, for example an ordinary printed letter, and a positive image thereof appears in the same way, but a negative image thereof would appear as lighter graphic information on a relatively darker background. For example, negative transmission images are produced when deformation of layer 12 (and consequent disruption and displacement of particles in layer 13) occurs at the relatively unexposed areas of the imaging member corresponding to the darker areas of a positive optical image to which it is exposed, because the disrupted areas are more light transmitting; and, of course, positive transmission images result when deformation and relocation is made to occur at the exposed areas of the member corresponding to the lighter areas of a positive optical image.

For example, typically, when a fracturable laterally relocatable overlayer 13 is used on such preferred thermoplastic deformable layers 12 as HP100, Piccotex 100, SR5061A and Staybelite Ester 10 usually imaging with positive potentials results in frost wrinkling in the unexposed areas to give a negative transparency from a positive original. Imaging with negative potentials results in a positive from a positive original, i.e. wrinkling in the exposed areas for the first three plastics and a negative from a positive original from the last plastic. Opposite type images have also been obtained specifically for Piccotex 100 and for Staybelite using positive or negative charging, the exceptions believed to be due, at least in part, to the condition of the deformable layer 12 before imaging and the magnitude of the potential.

When a mechanically continuous overlayer 13 is used, the images obtained typically are viewable by all the modes used for viewing laterally relocatable overlayers. Reflection viewing is particularly good for the preferred photosensitive materials comprising amorphous selenium and other specularly reflecting photosensitive layers because the reflection off the selenium, which may be greater than 25%, is better than off plastics conventionally found to be surface layered on imaging members in electrostatic deformation imaging systems. Reflection is also generally better because mechanically continuous layers are generally more specularly reflecting than fracturable and particulate layers. When used as a transparency, the imaging member employing a mechanically continuous overlayer is found to transmit light in the smooth, unwrinkled areas and to transact substantially less light in the wrinkled areas by virtue of scattering of light out of the projection system. The wrinkled, i.e., frosted or relief imaged, areas according to the present invention are found to correspond to the denser or blacker areas on the projection screen with the unwrinkled or smooth portions of layer 13 being the lighter areas. For example, preferred photosensitive layers of amorphous selenium within the preferred thickness range of from about 0.01 to about 0.05 micron appear straw yellow to yellow-orange in color and the unwrinkled, smooth areas are found to transmit more than 40% of visible light when a substantially clear deformable material such as Staybelite Ester 10 is layered on a substantially clear substrate such as aluminized Mylar.

The class of overlayers which are fracturable, but not laterally relocatable such as tightly packed particle layers or fracturable layers where wrinkling is not deep enough to cause disruption and relocation of the overlayer (due for example to lower voltages, shorter imagewise exposure or less development) have image viewing characteristics similar to the mechanically continuous overlayered imaging members hereof. Some fracturable layers may be caused to respond as in FIG. 4 with no lateral relocation for example by heat softening the member on a hot plate to obtain an image of a first sense. By leaving the member on the hot plate for a little longer, the deformations are increased in height and depth to cause lateral relocation of layer 13 to cause an image to be formed of a sense opposite said first image sense. Continued heating on the hot plate causes erasure of the wrinkles.

While frost wrinkling techniques have been described in some detail, it will be appreciated, of course, that the members hereof may also be optically deformed utilizing relief wrinkling techniques. Generally, relief development requires lower voltages, shorter softening times at lower temperatures than the corresponding figures for frost.

The following examples further specifically define the present electrostatic deformation imaging system. The parts and percentages are by weight and all exposures are from a tungsten filament light source, unless otherwise indicated. The Mylar substrates are about 3 mils thick unless otherwise specified. The examples below are intended to illustrate various preferred embodiments of the electrostatic deformation imaging system of this invention.

Examples A–I to A–XVI are for fracturable, laterally relocatable overlayers; Examples B–I to B–IV are for non-fracturable, mechanically continuous overlayers; and Examples C–I to C–XI are for fracturable overlayers which do not disrupt or laterally relocate in response to the wrinkling of the deformable layer, but instead wrinkle in conformance with the wrinkles of the deformable layer, as shown in FIG. 4.

EXAMPLE A–I

A member is prepared by vacuum evaporating about a 0.5 micron layer of amorphous selenium, appearing as spheres of about 0.5 microns in diameter when observed under a microscope onto a layer of Piccotex 100 about 2 microns thick overlying an aluminized Mylar substrate.

The selenium layer is uniformly electrostatically charged to a positive surface potential of about 130 volts by means of a corona discharge device. The plate is then exposed to a positive optical image of about 4 f.c.s. in exposed areas. The exposed member is then heated to about 100° C. for about 10 seconds whereby the Piccotex 100 layer is caused to be frost wrinkled, with corresponding disruption and lateral relocation of the overlying selenium layer, in the imagewise unexposed areas to produce a negative image from the positive optical image of high resolution i.e. greater than about 150 line pairs/mm.

The member, when viewed directly, appears to the eye as a negative image since the exposed areas of the member corresponding to the lighter or more transmissive areas of the original do not frost and appear as relatively darker smooth selenium areas while the unexposed areas, which frost wrinkled, where the selenium is disrupted and laterally relocated absorb less light and look lighter to the naked eye. The member when used as a projection transparency also produces a high resolution negative projection image since the portions of the replica which appear lighter to the eye are more light transmissive than the darker, unwrinkled, undisrupted, non-relocated portions of the member.

However, when viewed by reflected light, for example by the system of copending application 619,072 or by slanting the member to optimize the light reflected to the eye from the smooth more specularly reflecting unwrinkled areas, the imaging member appears as a positive image.

EXAMPLE A–II

The imaged member of Example A–I is heated at about 100° C. for about 20 seconds more to erase and smooth out the wrinkling in the unexposed areas to leave an imaged member which when viewed directly by the eye or by transmission, exhibits a negative image similar to the image of Example A–I before erasure. The projected image is denser and of higher contrast after erasure of the wrinkling.

EXAMPLE A–III

This example is similar to Example A–I and illustrates that by changing process parameters, i.e., a higher voltage surface potential, the image sense of the system may be changed.

A member is prepared by vacuum evaporating a thin fracturable layer of amorphous selenium of about 0.2 microns in thickness, appearing as spheres of about 0.2 micron in diameter when observed under a microscope, onto a layer of Piccotex 100 about 2 microns thick on an aluminized Mylar substrate.

The surface of the member is uniformly electrostatically charged to a positive surface potential of about 200 volts by means of a corona discharge device. The plate is then exposed to a positive optical image with about 2 f.c.s. in exposed areas. The exposed member is then heated to about 100° C. for about 2 seconds whereby frost wrinkling, with corresponding disruption and lateral relocation of the selenium layer in corresponding areas, is found to occur in the imagewise exposed areas to produce a positive image, when viewed directly or by transmission, of the positive optical image, the replica being of high resolution, comparable to that of the replica of Example A–I and directly viewable by the eye as relatively darker image areas (the smooth unwrinkled areas) in a background of wrinkled, selenium disrupted and laterally relocated areas which absorb less light and look lighter to the naked eye. The member when used as a projection transparency also produces a high resolution positive projection image.

EXAMPLE A–IV

The imaging member of A–III is uniformly electrostatically charged to a positive surface potential of about 100 volts, being below the charge density threshold for frost wrinkling for this particular member, and exposed and softened as in Example A–III. A relief deformation is formed disrupting the selenium layer at the edges of the exposed and unexposed areas, relocating selenium from the edge of exposed areas into the unexposed areas to produce to the eye an outline of a relatively lighter portion in a darker background.

When used as a projection transparency, the outline wrinkle appears on an image screen as a projected brighter outline pattern in a dark background.

EXAMPLE A–V

Example A–I is followed except that the selenium is vacuum evaporated onto about a 2 micron layer of Staybelite Ester 10 instead of Piccotex 100; a uniform charge of about +150 volts is applied and exposure is about 6 f.c.s. in exposed areas. Again, a negative image results, when viewed directly or by transmission, from a positive optical image.

EXAMPLE A–VI

A positive transmission and directly viewable replica is made from a positive optical image (or of course, a negative replica from a negative optical image as will be understood throughout the example and description of the invention) by first preparing a member, by vacuum evaporating a thin fracturable layer of amorphous selenium, from about 0.2 to about 0.5 micron thick onto about a 2 micron layer of Piccotex 100 overlying a NESA glass substrate. The member is imaged by uniformly electrostatically charging the member to a negative surface potential of about 100 volts and then exposing the charged member to about a 3 f.c.s. light image. The member is then heated at about 100° C. for about 10 seconds to cause frost wrinkling of the Piccotex 100 layer in the exposed areas with attendant displacement of the amorphous selenium fracturable overlayer so that the exposed areas of the replica corresponding to the lighter areas of the original appear in transmission and appear to the eye on direct viewing as the lighter areas.

EXAMPLE A–VII

A positive transmission and directly viewable replica is also produced from a positive optical image by preparing a member by vacuum evaporating a thin fracturable layer of selenium from about 0.2 to 0.5 micron thick onto about a 2 micron layer of SR–5061A silicone resin overlying NESA glass. The member is uniformly electrostatically charged to a negative surface potential of about 300 volts by means of a corona discharge device, then exposed to about a 3 f.c.s. positive light image in exposed areas. The member is then heated for about 10 seconds at about 100° C. which results in deformation of the silicone resin layer in the exposed areas to produce a positive disruption image when viewed in transmission or as viewed directly by the eye.

EXAMPLE A-VIII

A negative transmission and directly viewable replica results by applying the process steps of Example A-I using a member made by cascading commercial indigo particles available from National Aniline Co. across a layer of Staybelite Ester 10 about 2 microns in thickness on an aluminized Mylar substrate, to form a particulate, fracturable, laterally relocatable overlayer about 0.5 micron thick. Wrinkling with attendant disruption and lateral relocation of the indigo occurs in the unexposed areas.

EXAMPLES A-IX AND A-X

These two examples additionally illustrate the effect of charge polarity on image sense. Two members are prepared by vacuum evaporating a fracturable film of amorphous selenium about 0.2 microns in thickness onto about a 2 micron layer of HP100 overlying an aluminized Mylar substrate. A negative surface charge of about 200 volts is applied to one member. The member is then exposed to about a 3 f.c.s. light image in exposed areas and then heated at about 100° C. for about 10 seconds to cause frost wrinkling and disruption of the overlayer in the exposed areas to produce a positive transmission and directly viewable replica image from a positive optical image. Carrying out this same process with an applied positive surface charge of about 200 volts produces frost wrinkling in the unexposed areas to produce a transmission and directly viewable negative image from the same positive optical image.

EXAMPLE A-XI

Submicron sized zinc oxide particles are cascaded over about a 2 micron layer of Staybelite Ester 10 on an aluminized Mylar substrate to form about a 0.5 micron thick fracturable and laterally relocatable overlayer of zinc oxide.

An image charge pattern is deposited on the zinc oxide layer in the substantial absence of actinic radiation for the zinc oxide, by charging through a stencil, the negative terminal of a direct current source electrically connected to the aluminum layer with the positive terminal electrically connected to the corona wire of a corona discharge device to bring the charged areas to a positive surface potential of about 150 volts with substantially no measurable charge in the uncharged areas. The member is then heated at about 100° C. for about 10 seconds to form a frost image in the charged areas with disruption and lateral relocation of corresponding portions of the overlayer to give a positive transmission and directly viewable image from a positive charge image.

EXAMPLES A-XII—A-XIV

Example A-XI is repeated except that the fracturable, laterally relocatable overlayer, respectively, is about a 0.5 micron layer of: indigo cascade deposited on the Staybelite Ester 10; amorphous selenium vacuum evaporated on the Staybelite Ester 10; and graphite cascade deposited on the Staybelite Ester 10.

In each case frosting and attendant disruption of the overlayer in corresponding areas with relative transparentizing takes place in the charged areas.

EXAMPLE A-XV

About a 0.5 micron layer of indigo is cascade dusted on about a 2 micron layer of Piccotex 100 on an aluminized Mylar substrate. An image charge pattern is deposited on the indigo in the substantial absence of actinic radiation for the indigo, by charging through a stencil, to bring the charged areas to a negative surface potential of about −400 volts in charged areas with substantially no charge in uncharged areas. The member is then heated to about 100° C. for about 20 seconds to cause frost wrinkling in the charge areas, with attendant disruption with relative transparentizing in corresponding areas of the overlayer.

EXAMPLE A-XVI

About a 0.3 micron fracturable and laterally relocatable layer of amorphous selenium is vacuum evaporated on about a 2 micron layer of Piccotex 100 on an aluminized Mylar substrate. The member is imaged by uniformly electrostatically charging it to a negative surface potential of about −400 volts, exposing it to a negative optical image with exposures being about 3 f.c.s. in exposed areas followed by heating at about 100° C. for about 20 seconds to produce wrinkling of the Piccotex 100 layer in the unexposed areas and attendant disruption and lateral relocation of the overlayer of selenium in corresponding areas to produce a positive image when directly viewed by the eye or in transmission since relatively dark areas in the original appear in the replica as relatively lighter areas which areas are more transmissive and will appear as the lighter areas on a projection screen.

EXAMPLE B-I

An imaging member is prepared by applying by means of vacuum evaporation a mechanically continuous, non-particulate, non-fracturable, non-perforated, thin, about 0.1 micron thick, layer of amorphous selenium to a layer of Staybelite Ester 10, about 2 microns thick in layer form overlying an aluminized Mylar substrate.

A substantially uniform surface charge of about +200 volts is applied to the selenium layer by means of a corona discharge device. The plate is then exposed to an optical image of about 20 f.c.s. in illuminated areas. The exposed member is then heated to about 60° C. for about 15 seconds by resting it in contact with a hot plate whereby frosting occurs in the imagewise unexposed areas to produce a positive reflection and transmission image of a positive original with continuous tone response, high density, negligible background and high resolution, being greater than about 80 line pairs per millimeter, which may be viewed directly by reflected light or may be used as a projection transparency with a reddish transmittance where transmittance equals the ratio of light intensity out/light intensity into the imaged member of more than about 10% of white light in unfrosted areas and virtually no transmittance in frosted areas. Red light, to which the unwrinkled areas of selenium are more transparent, has an even greater transmittance. Also, longer wavelength red, although not visible could be used, to expose red sensitive photosensitive films or members in frosted image configuration. A high contrast reflection image is also obtained using the system as describd in aforementioned copending application Ser. No. 619,072.

EXAMPLE B-II

An imaging member is prepared by intimately mixing about 1 part of X-form metal-free phthalocyanine particles prepared as described in copending application Ser. No. 505,723 filed Oct. 29, 1965 now U.S. Pat. No. 3,357,989, about 3 parts of Piccotex 100 and about 10 parts Isopar G, a long chain saturated aliphatic hydrocarbon liquid, boiling point 315–350° F. from Humble Oil Co. and coating this mixture on about a 2 micron layer of Piccotex 100 on about a 3 mil thick Mylar film base, to a dried thickness of about 0.3 microns.

The member is uniformly electrostatically charged, by double sided corona charging to a negative surface potential of about 4000 volts. The member is then exposed to an optical image of about 10 f.c.s. in exposed areas. The exposed member is then heated at about 100° C. for about 10 seconds whereby frosting occurs in the imagewise unexposed areas to produce a positive reflection and transmission image on a positive original of a quality similar to the image of Example I. A transmittance of more than about 75% of blue light is observed in unfrosted areas and less than about 25% effective transmittance i.e., where the light intensity out is actually collected by the projection system, in frosted areas when projected by an f/4.5 projection system.

EXAMPLE B–III

About ten parts of the primarily ultraviolet sensitive organic photoconductor corresponding to Formula 2 of Canadian Pat. No. 568,707 are mixed with about 10 parts of Vinylite VYNS (Union Carbide), about 100 parts diethyl ketone and about .01 part Rhodamine B, a red water-soluble dye available from Du Pont. A solution is also prepared containing about 1 gram of Staybelite 10 in about 2.4 cc. of toluene. Ten parts by volume of this latter solution are mixed with one part by volume of the former.

The mixture is coated on a donor and dried to a thickness of about 0.4 micron and stripped off onto about a 2 micron layer of Staybelite 10 overlaying an aluminized Mylar substrate.

The member is uniformly electrostatically charged to a positive surface potential of about 600 volts and exposed to a positive ultraviolet optical image under normal room lighting conditions with the exposure in the illuminated areas being about $5 \times 10^{-2}$ watt-sec./cm.$^2$. The exposed member is then heated at about 70° C. for about 15 seconds whereby frosting occurs in the imagewise unexposed areas to produce a positive, reflection and transmission viewable image from a positive original with quality similar to the image of Example I. A transmittance of more than about 60% of white light is observed in unfrosted areas, the transmittance being lower than the 75% figure of Example B–II because of the additional light blocking character of the thin aluminum layer of this Example B–III, with effective transmittance in frosted areas when projected by an f/4.5 projection system being less than about 25%.

EXAMPLE B–IV

An imaging member is prepared by mixing about 10 parts of the primarily ultraviolet sensitive organic photoconductor corresponding to Formula 2 of Canadian Pat. No. 568,707 with about 100 parts acetone, the mixture being directly coated on about a 2 micron layer of Staybelite Ester 10 overlying an aluminized Mylar substrate.

The member is imaged and viewed as in Example B–III.

EXAMPLE C–I

A fracturable layer of selenium comprising about 0.2 micron diameter particles is vacuum evaporated on about a 2 micron thick layer of Piccotex 100 on an aluminized Mylar substrate.

The member is imaged by uniformly electrostatically charging the member to a positive surface potential of about 100 volts, exposing it to a positive optical image with about 5 f.c.s. in exposed areas and subjecting the member to a temperature of about 100° C. for about 2 seconds to form a relief image only at the edges of the exposed and unexposed areas, the plastic appearing to be moved into the unexposed areas at the edges of the image areas.

EXAMPLE C–II

Example C–I is followed except that the member is uniformly electrostatically charged to a positive surface potential of about 200 volts and subjected after exposure to a temperature of about 100° C. for about 1 second resulting in frost wrinkling in exposed areas to produce a negative image when viewed by the eye or viewed in transmission from a positive optical image because the frosted areas are less transmissive than the non-frosted areas and appear to the naked eye to be much more diffusely reflecting thus appearing darker to the naked eye when held in an angle to maximize the reflected light and thereby the brightness of the non-frosted, smoother areas of the overlayer of selenium.

EXAMPLE C–III

A thin fracturable monolayer of amorphous selenium of about 0.2 micron diameter particles is vacuum evaporated on about a 2 micron layer of Staybelite Ester 10 on an aluminized Mylar substrate. The member is uniformly electrostatically charged to a positive surface potential of about 200 volts exposed to a positive optical image with exposure being about 10 f.c.s. in exposed areas.

The member is softened by subjecting it to a temperature of about 70° C. for about 1 second to cause frosting in unexposed areas to produce a positive replica from a positive optical image with resolutions exceeding 80 lp./mm.

EXAMPLE C–IV

A featurable monolayer of selenium particles about 0.1 micron in diameter are vacuum evaporated on about a 2 micron layer of Staybelite Ester 10 on an aluminized Mylar substrate. The member is uniformly electrostatically charged to a positive surface potential of about 110 volts and exposed to a positive optical image of about 4,000 angstrom unit light with the total exposure in exposed areas being $2.5 \times 10^{11}$ photons/cm.$^2$, the member

EXAMPLE C–V then being heated at about 80° C. for about 5 seconds with frosting occurring in the unexposed areas to produce a positive to positive imaging system.

Example C–IV is followed except that the member is uniformly electrostatically charged to a positive surface potential of about 60 volts rather than 110 volts with the result that relief wrinkling only occurs in an outline pattern between exposed and unexposed areas.

EXAMPLE C–VI

A monolayer of selenium particles about 0.02 micron in diameter is vacuum evaporated on about a 3 micron layer of HP 100 on an aluminized Mylar substrate.

The imaging member is uniformly electrostatically charged to a positive surface potential of about 200 volts and exposed to an optical image with exposure in light struck areas being about 4 f.c.s.

The member is softened by subjecting it to about 90° C. for about 5 seconds resulting in frosting in unexposed areas.

EXAMPLE C–VII

A layer about 0.5 micron thick of particles of Monastral Red B available from Du Pont is cascade deposited on about a 2 micron thick layer of Staybelite Ester 10 on an aluminized Mylar substrate.

The member is uniformly electrostatically charged to a negative surface potential of about 160 volts and exposed to an optical image with exposure in exposed areas being about 72 f.c.s. The member is then heated to about 70° C. for about 5 seconds to cause frosting in unexposed areas.

EXAMPLE C–VIII

A layer about 1.5 microns thick of zinc oxide particles is cascade deposited on about a 2 micron thick layer of Staybelite Ester 10 on an aluminized Mylar substrate.

The member is uniformly electrostatically charged to a negative surface potential of about 120 volts and exposed to an optical image with exposure in light struck areas being about 40 f.c.s. The member is then heated at about 70° C. for about 5 seconds to cause frosting in unexposed areas.

EXAMPLE C-IX

A layer about 0.5 microns thick of indigo particles is cascade deposited on about a 2 micron thick layer of Staybelite Ester 10 on an aluminized Mylar substrate.

The member is uniformly electrostatically charged with a negative surface potential of about 140 volts and exposed to an optical image with exposure in exposed areas being about 100 f.c.s. The member is heated at about 100° C. for about 3 seconds to cause frosting in unexposed areas.

EXAMPLE C-X

A member is prepared as in Example C-IX except that the Staybelite is replaced by Piccotex 100.

The member is uniformly electrostatically charged to a negative surface potential of slightly greater than 100 volts and exposed to an optical image with exposure in illuminated areas being about 100 f.cs. The member is heated at about 70° C. for about 5 seconds to cause frosting in unexposed areas.

EXAMPLE C-XI

A layer about 0.5 microns thick of particles of Monolite Fast Blue GS, a mixture of alpha and beta forms of metal-free phthalocyanine available from the Arnold Hoffman Co. is cascade deposited onto about a 2 micron thick layer of Piccotex 100 on an aluminized Mylar substrate.

The member is uniformly electrostatically charged to a negative surface potential slightly greater than 100 volts exposed to an optical image with exposure in the illuminated areas being about 100 f.c.s. The member is heated at about 70° C. for about 5 seconds to cause frosting in unexposed areas.

Although specific components and proportions have been stated in the above description of preferred embodiments of this novel electrostatic deformation system, other suitable materials, as listed herein, may be used with similar results. In addition, other materials may be added to the materials used herein and variations may be made in the imaging members and process steps hereof to synergize, enhance, or otherwise modify its properties.

For example, various other sensitizers including dyes may be added to the photosensitive layers hereof to vary the light sensitivity of the members hereof. Also plasticizers, water proofing and other "proofing" agents may be added to the plastic materials hereof to change their characteristics as desired. One method modification makes use of the fact that a softened deformable layer may remain in a softened condition for periods ranging up to several minutes or more. This is particularly true where softening is accomplished by the vapors of high boiling liquids, or where heat softening is employed and member 10 has a large thermal mass. When layer 12 remains soft for a reasonable length of time, it is possible to soften it before exposure to the image pattern of light and shadow rather than afterwards.

Also, although in its simplest and preferred form the imaging member hereof employs a free surface photosensitive layer which is exposed by radiation impinging from the photosensitive layer side of the imaging member, exposure may be from the substrate side of substrate 11 and deformable layer 12 are at least partially transparent to the exposing radiation. Also layer 13 may be surface layered with another layer of material.

In addition wrinkle images may be erased by softening the deformable layer optionally in the presence of light which permits surface tension forces to restore the surface of layer 12 and layer 13 to a smooth condition. The member may then be rewrinkled.

It will be understood that various other changes in the details, materials, steps and arrangements of parts, which have been herein described and illustrated in order to explain the nature of the invention, will occur to and may be made by those skilled in the art upon a reading of this disclosure, and such changes are intended to be included within the principle and scope of this invention.

What is claimed is:
1. An imaging method comprising the steps of:
 (a) providing an imaging member comprising an electrostatically photosensitive layer, electrostatically photosensitive to actinic radiation within the visible spectrum and substantially completely resistant to lateral relocation, overlying a softenable, electrostatically deformable layer, wherein said electrostatically photosensitive layer is distinct from and different in composition from said electrostatically deformable layer;
 (b) uniformly electrostatically charging said member;
 (c) exposing said member to an image pattern of actinic radiation within the visible spectrum; and
 (d) softening said deformable layer whereby it and corresponding portions of said overlying photosensitive layer wrinkle in an image configuration.
2. An imaging method comprising the steps of:
 (a) providing an imaging member comprising an electrostatically photosensitive layer, substantially completely resistant to lateral relocation, overlying a softenable, electrostatically deformable layer, substantially electrostatically non-photosensitive to the radiation in step (c);
 (b) electrostatically charging said member;
 (c) exposing said member to an image pattern of radiation actinic for said electrostatically photosensitive layer; and
 (d) softening said deformable layer whereby it and corresponding portions of said overlying photosensitive layer wrinkle in an image configuration.
3. An imaging method according to claim 1 wherein said electrostatically photosensitive layer is between about 0.01 and about 0.5 microns thick and is photoconductive.
4. An imaging method according to claim 2 wherein said electrostatically photosensitive layer is between about 0.01 and about 0.5 microns thick and is photoconductive.
5. An imaging method according to claim 3 wherein said photoconductive layer comprises amorphous selenium.
6. An imaging method according to claim 4 wherein said photoconductive layer comprises amorphous selenium.
7. An imaging method according to claim 3 wherein the material of said softenable layer has an electrical resistivity in darkness of at least about $10^{10}$ ohm-cm. and said softenable layer is substantially transparent and on a substantially transparent substrate.
8. An imaging method according to claim 4 wherein the material of said softenable layer has an electrical resistivity in darkness of at least about $10^{10}$ ohm-cm. and said softenable layer is substantially transparent and on a substantially transparent substrate.
9. An imaging method according to claim 7 wherein said member is uniformly electrostatically charged to a surface potential between about 30 to about 300 volts and wherein said softenable layer is between about ½ and about 16 microns thick.
10. An imaging method according to claim 8 wherein said member is uniformly electrostatically charged to a surface potential between about 30 to about 300 volts and wherein said softenable layer is between about ½ and 16 microns thick.
11. An imaging method according to claim 7 wherein said deformable layer is softened by heating it to between about 50° C. and about 130° C. for a duration of from about 1 to about 20 seconds.
12. An imaging method according to claim 8 wherein said deformable layer is softened by heating it to between about 50° C. and about 130° C. for a duration of from about 1 to about 20 seconds.

13. An imaging method according to claim 7 wherein said member is softened by exposing it to vapors of a solvent for the deformable material.

14. An imaging method according to claim 8 wherein said member is softened by exposing it to vapors of a solvent for the deformable material.

15. An imaging method according to claim 3 wherein said electrostatically photosensitive layer is a mechanically continuous layer which is also at least partially softened at some time during the softening of said deformable layer.

16. An imaging method according to claim 4 wherein said electrostatically photosensitive layer is a mechanically continuous layer which is also at least partially softened at some time during the softening of said deformable layer.

17. An imaging method according to claim 1 wherein the minimum total effective exposure for wrinkling is not greater than about 100 f.c.s.

18. An imaging method according to claim 2 wherein the minimum total effective exposure for wrinkling is not greater than about 100 f.c.s.

19. An imaging method according to claim 7 wherein the minimum total effective exposure for wrinkling is not greater than about 100 f.c.s.

20. An imaging method according to claim 8 wherein the minimum total effective exposure for wrinkling is not greater than about 100 f.c.s.

References Cited

UNITED STATES PATENTS

| 3,291,600 | 12/1966 | Nicoll | 96—1 |
| 3,308,444 | 3/1967 | Ting | 340—173 |

OTHER REFERENCES

Nicoll "A New Surface Phenomenon in Thermoplastic Layers and Its Use in Recording Information." RCA Review, June 1964, p. 210.

GEORGE F. LESMES, Primary Examiner

J. C. COOPER III, Assistant Examiner

U.S. Cl. X.R.

340—173, 346—77.5

UNITED STATES PATENT OFFICE
CERTIFICATE OF CORRECTION

Patent No. 3,542,545    Dated November 24, 1970

Inventor(s) William L. Goffe

It is certified that error appears in the above-identified patent and that said Letters Patent are hereby corrected as shown below:

Column 9, line 44, '"TEST"' should read -- "TESI" --.

Signed and sealed this 1st day of June 1971.

(SEAL)
Attest:

EDWARD M. FLETCHER, JR.
Attesting Officer

WILLIAM E. SCHUYLER, JR
Commissioner of Patents